March 7, 1967 S. A. COLGATE 3,307,357
VORTEX ROCKET REACTOR
Filed Feb. 18, 1964
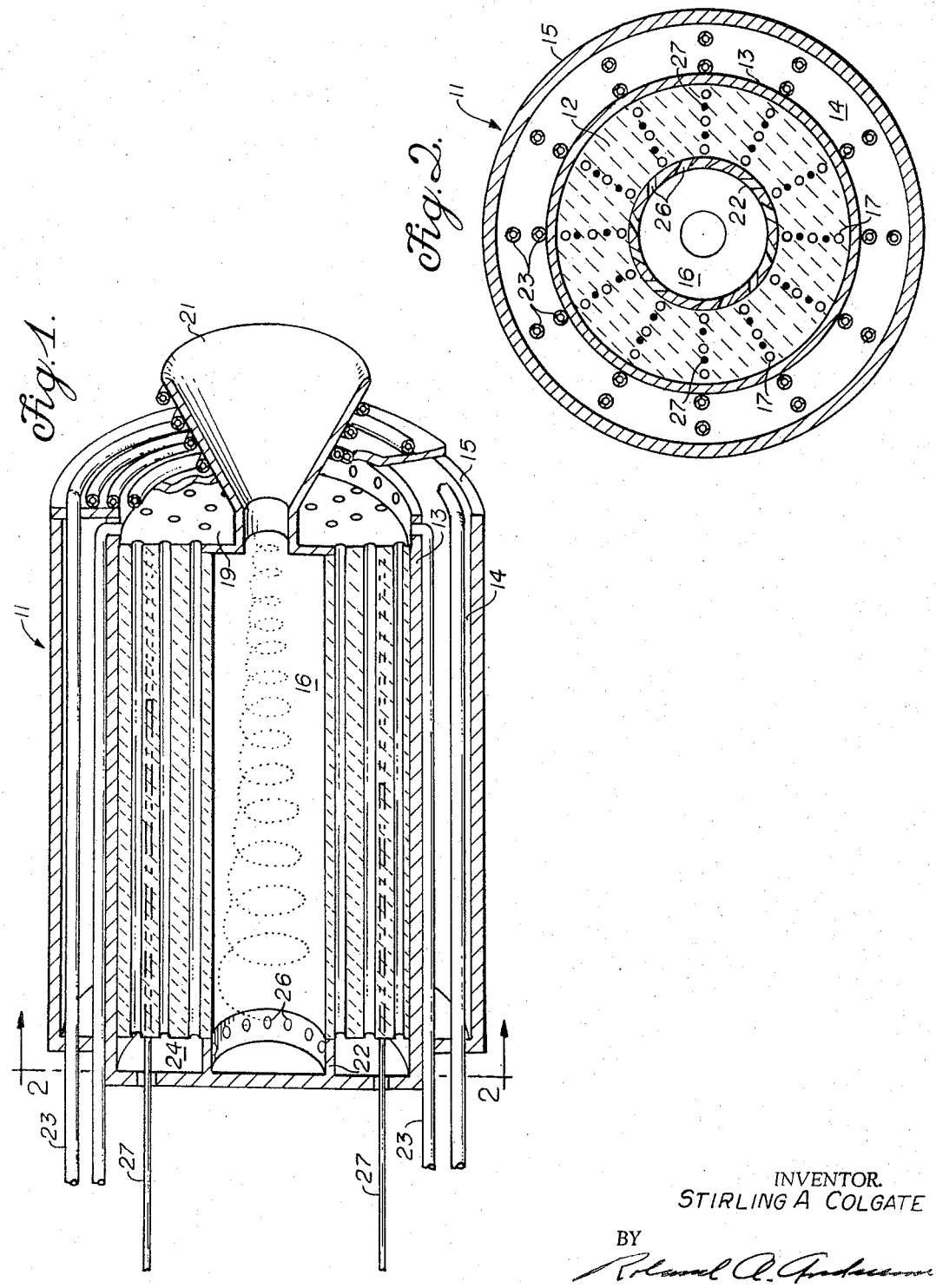
INVENTOR.
STIRLING A COLGATE
BY
ATTORNEY United States Patent Office 3,307,357
Patented Mar. 7, 1967

3,307,357
VORTEX ROCKET REACTOR
Stirling A. Colgate, Livermore, Calif., assignor to the United States of America as represented by the United States Atomic Energy Commission
Filed Feb. 18, 1964, Ser. No. 345,814
14 Claims. (Cl. 60—203)

This invention was evolved in the course of, or under Contract No. W-7405-ENG-48 with the United States Atomic Energy Commission.

The present invention relates to rocket propulsion and more particularly to methods for more efficiently energizing the working fluid or propellant therein.

In the field of nuclear rocket reactor design it has been proposed that the specific impulse of rocket propellants can be significantly increased by expanding the propellant isothermally rather than isentropically as is conventionally done. This isothermal expansion is brought about by convective heating of the propellant while it is passed through cone shaped channels, the divergence of which is determined by the rate of heating and related expansion of the axially moving propellant. However, convective heating is a relatively inefficient heating method, indeed, it appears that an isothermal expansion cannot be brought about by convective heating at all, since the convective heating is no greater than the frictional drag at the cone walls, and that therefore such a device is inoperable. However, even if it were operable, the exit velocity of the propellant, being directly dependent on the length of the cone shaped reactor channels, is curtailed by practical structural size limitations.

The present invention provides a method for isothermally heating the propellant which offers a further improvement in the specific impulse of the propellant and, at the same time a simplification of the reactor structure.

Generally the present method of energizing the propellant fluid comprises preheating the propellant in a nuclear reactor, tangentially injecting the propellant into a cylindrical cavity, heating the fluid to the reactor temperature, and isothermally expanding the fluid by radiative heat transfer from the walls of the cylindrical cavity and finally converting the kinetic energy into thrust.

Most significant among the improvements accruing to a rocket reactor in which the propellant is energized by the present isothermal expansion method are savings in reactor weight and volume as a direct result of the higher efficiency of radiative heat transfer. Also, while the propellant exit velocity of the present reactor is still dependent on the size of the reactor, this dependence is more advantageous compared to previous designs. This is again due to the higher radiative heat transfer efficiency as well as the fact that the energy transferred to the propellant is predominantly stored as a rotational kinetic energy. The increase in the axial flow rate of the propellant is therefore correspondingly smaller, whence the propellant dwells in the present reactor cavity longer than in the prior art channel reactors of comparable size and receives more heat. Thus the specific impulse limit set by the maximum practically feasible reactor size is much higher in the case of the present design.

The following detailed description of the present invention is made with reference to two drawings of which FIGURE 1 is a longitudinal cross section of a preferred embodiment of a nuclear rocket reactor wherein the propellant is heated by the method of the invention.

FIGURE 2 shows the reactor in a cross section perpendicular to its axis through the injection nozzle ring.

Referring now to these figures, the numeral 11 refers to a nuclear rocket engine comprising a uranium impregnated beryllium oxide core 12, disposed within an exterior pressure shell 13, surrounded by a graphite reflector 14 and enclosed by an outer vessel 15. The cylindrical beryllium oxide core defines a central cylindrical chamber 16 of radius $r_p$ and length L extending axially therethrough. The core itself comprises a snugly fitting array of a multitude of uranium impregnated beryllium oxide tubes which run parallel to the reactor axis, defining parallel channels 17 extending throughout the entire length of the core structure. Only a number of the channels are shown in the drawings for sakes of clarity. This reactor core may be essentially a conventional propulsion reactor core such as the KIWI or TORY reactor cores, provided with a central cylindical chamber. These reactors were developed in the Pluto and Rover projects of the Atomic Energy Commission and have been extensively and successfully tested. It should be noted that the core need not necessarily be beryllium oxide but could be a uranium oxide-graphite matrix or composed of any of the other commonly used core carbides.

The pressure shell, consisting of stainless steel or generally of a high strength, temperature resistant material having low neutron absorbtion characteristics, defines a plenum 19 for the introduction of propellant into one end of the tubes 17. A conventional exhaust nozzle 21 is integrally secured to the pressure vessel and in axial alignment therewith defining an exit port of radius $r$ from the chamber 16. Propellant gas is supplied to the plenum 19 from a propellant tank (not shown) via the ducts 23. These ducts constitute an array of tubes leading between the pressure shell 13 and the outer vessel 15 through the reflector 14 and provide cooling for this part of the structure. The nozzle and base are cooled by extending a number of the ducts 23 to lead the cold propellant adjacent to their surfaces. The pressure shell also defines a second annular plenum 24 at the other end of the reactor core for receiving the propellant which has been preheated within the channels 17.

In keeping with the invention, an injection nozzle ring 22 having an internal diameter substantially the same as that of chamber 16 is provided within the second plenum 24. This injection nozzle ring is perforated by a multiplicity of injection nozzles 26 which establish communication between plenum 24 and the chamber 16. The direction of these nozzles is substantially transverse to the axis of the chamber and tangential to its periphery for purposes more fully discussed below. The ring is constructed of a material having high strength and low neutron absorption properties, such as beryllium oxide. A plurality of control rods 27, only two of which are shown in FIGURE 1, penetrate into the core through plenum 24. These rods are formed of a material having a high neutron absorption cross section, e.g. boron, enclosed by a thin metal jacket. Conventional control rod drives, e.g. ball and screw type (not shown), are provided to drive these rods. The structural integrity of the reactor body as well as support for the reactor structure to transmit the thust of the reactor to the vehicle may be provided in any of the conventional ways, e.g. by supporting the reactor core with annular ceramic domes fore and aft or an inverted base plate-tie rod structure. If desired, the chamber 16 may be lined with a supporting metal structure, providing a material having low neutron absorption characteristics and high thermal conductivity and radiativity is used.

Turning now to the operation of the preferred embodiment, propellant flows through tubes 23 into the first plenum 19, thereby cooling the pressure shell, deflector, and the nozzle. From there the propellant passes through channels 17 and becomes preheated to the reactor temperature $T_0$ and passes into the second plenum 24. From the plenum 24 gas is injected tangentially into the cavity through the injection nozzles 26 in the injection nozzle ring 22. These nozzles are of standard shape and impart the propellant gas a velocity greater than the sound speed in the chamber. This velocity is readily obtained due to the conversion of some of the internal energy of the gas into forward velocity in the standard nozzle. The velocity and mass rate of injection of the propellant will be specified below. During injection, the gas expands adiabatically and cools down to a lower temperature.

As a consequence of the high injection velocity the bulk of the propellant is concentrated in a relatively thin layer of constant angular momentum adjacent to the walls of the reactor structure 12. Upon injection the propellant is reheated by radiation from the walls of the chamber 16 and expands at constant pressure until it has been brought to the reactor temperature $T_o$ again. From then on the fluid continues to expand isothermally. Provided the conditions given below are met, the mass of the gas is initially concentrated in a thin actually uniform annulus along the periphery of the cavity and will expand radially toward the axis of the cavity due to the heating. Also, due to the continuous injection of additional propellant its annular bulk will spread in the axial direction toward the exit nozzle 21 through which it finally leaves the chamber 16. During expansion in the radial direction toward the axis its rotational kinetic energy increases with a decrease in the radius of fluid rotation since the angular momentum is constant.

The radius $r$ of the nozzle opening of the cavity, being smaller than the radius $r_o$ of the cavity, determines the minimum rotational kinetic energy content of the propellant which leaves the cavity. This rotational kinetic energy is transformed into axial energy and thrust in the nozzle 21. Due to the propellant's high energy component perpendicular to the nozzle axis, a nozzle of comparatively large nozzle divergence may be employed.

The propellant fluid rotating about the axis at a smaller radius rotates faster. Hence, the fluid motion through the chamber 16 is in the characteristic form of a vortex as indicated by the helical dotted line in the drawing. To attain this vortex motion, and the inherent benefits discussed above, certain conditions must be met by the operating parameters. These parameters are injection configuration, injection velocity, maintenance of constant angular momentum, the opacity of the gas necessary for the proper magnitude of the energy transfer between the wall and the propellant, and dimensional properties of the cavity.

The first condition, the disposition of the injection nozzle for the working fluid in relation to the cavity and the nozzle has been indicated. The preferred direction of injection of the fluid is substantially transverse to the axis and tangential to the periphery of the cavity.

The second condition is that the fluid must be injected at a Mach number M substantially larger than unity. More precisely, $M^2$ should be about 3 or more. This corresponds to a minor velocity increase over and above the thermal velocity of the gas and is easily realized in a nozzle having an expansion ratio greater than $e^{1/\gamma-1}$ which will convert a major part of the internal energy content of the gas $$\left(\frac{RT}{\gamma-1}\right)$$

into kinetic energy.

The density distribution for the fluid rotating in this thin annulus of constant angular momentum is $$\left[\rho = \rho_o e^{M^2\left(\frac{r^2}{r_o^2}-1\right)}\right]$$

wherein $\rho$ is the density at any radial distance, $\rho_o$ the density at the chamber periphery, $r$ is the radial distance, $r_o$ the radial distance to the periphery and M the Mach number of the gas, given by $$M = \frac{u_o}{c_o}$$

where $u_o$ is the injection velocity of the propellant and $c_o$ the sound speed in the chamber 16. The Mach number condition is necessary to render the density $\rho$ rapidly diminishing with the radius $r$. Preferably the magnitude of $M^2$ should be at least 3.

The third condition is the constancy of angular momentum of the propellant with time in the entire cavity which also determines the mass rate of propellant injection into the chamber 12 through the nozzles 26 as shall be seen. The fourth condition is the minimum radiative energy transfer from the reactor walls to the propellant in the chamber.

Since the drag forces on the propellant play the key role in determining these conditions, it is warranted to discuss them in more detail.

The internal losses due to drag forces acting on the propellant at the walls of the chamber can be separated into the drag along the cylindrical reactor wall surface and the drag at the end zone in the region where the chamber merges into the nozzle. Losses due to internal friction are negligible since the internal gas flow is laminar and the shear flow irrotational at constant angular momentum.

The drag is a quantity important in two respects; firstly, it enters into the constant angular momentum considerations; secondly, it presents an energy loss and thereby requires the energy transfer from the wall to the fluid to be greater than a certain minimum value before any gain in rotational kinetic energy can be conferred to the gas.

To obtain the vortex form of propellant flow which occurs at constant angular momentum, it is necessary that the total angular momentum supplied to the mass of the propellant in the chamber, i.e., the angular momentum associated with the injected gas be equal to the angular momentum removed by the friction at the walls and by the degraded exhaust. It follows that the angular momentum addition due to injection of fluid must be larger than the loss due to drag, and preferably should exceed it by as large an amount as possible.

The magnitude of the drag $D_w$ at the outer walls is appraised by the relation $$D_w = c_f \rho u^2$$

where $c_f$ is the coefficient of turbulent skin friction, and $\rho$ and $u$ are the density and velocity of the fluid respectively. The drag in the endzone $D_e$ depends on the thickness of the Eckmann layer. If this layer is less than 100 mean free paths the drag is simply the laminar shear stress and is negligible. If the layer is thicker than 100 mean free paths, the gas flow becomes turbulent and the endzone drag is given by the same equation as for the drag at the outer walls.

An integration of the end-zone drag for the condition of turbulence, i.e., $$D_e = \int_{r_o}^{r} c_f \rho u^2 (2\pi r) dr$$

where $$\rho = \rho_o \exp\left[M^2\left(1 - \frac{r_o^2}{r^2}\right)\right]$$

yields $$D_e = \frac{\pi}{2} c_f \rho_o \left(\frac{r_o u_o}{M}\right)^2$$

On the other hand, for a length L the outer wall drag $D_w$ is found to be $D_w = 2\pi r_o L c_f \rho_o u_o^2$ where the symbols have the earlier assigned significance. If the chamber length is large compared to its radius, i.e., $$L \gg \frac{r_o}{4M^2}$$

which is indeed the case in a practical application of the present invention, the endwall drag is small compared to the outer wall drag and can therefore be neglected in the assessment of the total drag.

The drag determines the momentum flow per unit length; from Newton's second law:

$$D = 2\rho_o u_o r_o \dot{r} \text{ dynes}$$

where $\dot{r}$ is the radial velocity of the mass flow in that direction.

Multiplied by the length of the cavity this expression gives the minimum rate of addition of angular momentum to the chamber by the injection of propellant to satisfy the third condition.

The overall mass flow can also be described in terms of results from the preceding drag considerations. Since all injected matter is ultimately exhausted through the nozzle after radially flowing from the initial injection radius $r_o$ to the smaller nozzle radius $r$, exhaust flow, injection flow and radial flow are equal. The radial flow velocity is therefore:

$$\dot{r}_o = c_f u_o$$

Since the radial mass flow per unit length must be a constant for any $r$, i.e., $2r\rho\dot{r} = K$ it follows that the radial flow rate $$\dot{r} = c_f u_o \frac{r_o \rho_o}{r_o \rho}$$

This then is the minimum mass rate of propellant injection required to satisfy the third condition.

The energy supplied to the fluid must be greater than the energy removed by the drag at the wall.

The fourth condition expressing the minimum energy which must be transferred to the fluid can therefore be formulated in terms of the energy removed by the drag, which is $$\dot{W} = c_f u_o \frac{u_o^2}{2} \rho_o \text{ ergs./gm. sec.}$$

The fifth condition for operability of the present invention concerns the opacity which the fluid is required to possess in order to absorb the quantity of radiation energy specified in condition 4. The quantity of energy $\dot{W}$ is to be absorbed per unit time and per unit mass of fluid is simply the work required to expand the fluid, since the expansion process is isothermal, i.e., $$\dot{W} = \frac{d}{dt} \int_{V_o}^{V} \rho dv = \frac{\rho_o v_o}{\rho} \frac{d\rho}{dt}$$

The solution of this expression requires the knowledge of the density distribution of the gas during the isothermal expansion at constant angular momentum. From elementary principles this density distribution is readily found to be $$\rho = \rho_o \exp\left[M^2\left(1 - \frac{r_o^2}{r^2}\right)\right] \text{ grams/cm.}^3$$

The energy rate per unit mass becomes therefore $$\dot{W} = \frac{2}{\gamma} u_o^3 c_f \frac{r_o^3}{r^4} \exp\left[M^2\left(\frac{r_o^2}{r^2} - 1\right)\right] \text{ ergs/gm. sec.}$$

According to Stephan's law the opacity of the gas must therefore meet the following minimum:

$$\mu = \frac{2c_f r_o^3 u_o^3}{c_e k T^4 r^4} \exp\left[M^2\left(\frac{r_o^2}{r^2} - 1\right)\right] \frac{cm^2}{g.}$$

where $c_e$ is the velocity of light, $k$ is Boltzmann's constant, T is the temperature of the cavity, and $c_f$ is the coefficient of friction. If the propellant does not meet this opacity requirement, it is necessary to add a sufficient quantity of a higher specific opacity contaminant to raise the overall opacity to an acceptable value. This procedure is of particular importance in the case where the propellant is hydrogen. The preferred additives for hydrogen are finely divided carbon or the halogens.

In general, only low molecular weight additives are acceptable to adjust the opacity requirements of a working fluid, since heavier additives tend to separate from the fluid, during rotation in the chamber, thereby preventing maintenance of a homogeneous distribution. The condition for suspension of an additive is that the radial drag on the particle be equal to the centrifugal force of the particle, which tends to pull it toward the wall. Since this criterion can be quantitatively assessed, it is used in the selection of the proper additive.

Specifically:

$$R = \frac{\rho_o c_f r^2}{4\rho_p r_o^2} \text{ cm.}$$

where R is the radius of the additive particle, and $\rho_p$ its density and the other symbols have the signficance earlier assigned to them.

The fact that for large particles the centrifugal force exceeds the drag forces on them is indeed fortuitous since it counteracts loss of fuel from the casing due to erosion in cases where the cavity wall is an atomic reactor.

The final condition concerns the dimensions of the cavity and the exhaust opening. It has been stated that axial mass flow must be equal to the radial mass flow. For this reason the exhaust area is not independent but must be sufficiently large to permit the escape of the fluid at the rate of radial flow.

If L is the length of cavity, the radial flow is given by $2\pi r_o \dot{r} \rho L$ which can be equated to the axial flow $\dot{z} A \rho$, where $\dot{z}$ is the axial flow velocity, and A the nozzle area.

The relation between the three dimensions L, $r$, and $r_o$ can now be derived by solving for L. Remembering that the effective area can be expressed as $\pi(r^2 - (r-h)^2)$ where $h$ is the scale height of the density distribution, i.e., $$r^3 / 2M^2 r_o^2$$

and that the limting axial flow is characterized by the fact that the axial velocity $\dot{z}$ equals the tangential velocity $\mu$, the relation between the length L and the radii $r_o$ and $r$ can be expressed as follows:

$$L = \frac{3r^2}{8r_o c_f} e^{\left[M^2\left(1 - \frac{r_o^2}{r^2}\right)\right]}$$

The enhanced performance of the present propulsion system can be determined from the total useful energy transfer to the working fluid.

Convective heating in the heat exchanger confers on the gas the internal energy $RT_o$ per mole, which is translated into the kinetic energy $$u_*^2/2$$

per unit mass of fluid on injection into the cavity.

After injection the gas is reheated from the temperature $T_1$ to the temperature $T_o$ and at the same time expanded at constant pressure. The total energy increased during this phase is therefore $\gamma R(T_o - T_1)$.

Finally the gas expands isothermally, whereby the energy is the work performed on the gas. This work is $$(\gamma - 1) R T_o \ln \frac{V_2}{V_o}$$

The total energy is simply the sum of these terms, i.e., $$W = R T_o \left\{ 1 + \gamma \left(1 - \frac{T_1}{T_o}\right) + (\gamma - 1)\left(M^2 \frac{r_o}{r^2} - 1\right) \right\}$$

The substitution of typical values into this expression yield $W \cong 3RT_o$, which corresponds to a specific impulse of $$\sqrt{\frac{6RT_o}{g}}$$

or, taken for the case of the ordinary prior art rocket reactor and substituting the same values, the specific impulse is greater by a factor of about $\sqrt{3}$.

Example

An exemplary nuclear rocket reactor, using hydrogen as a working fluid is provided with its fissionable material disposed to provide a cylindrical cavity 40 cm. in diameter and 1 m. long. The cavity opens into a coaxially mounted exit nozzle, the opening of which has a radius of 14 cm. During operation, the cavity walls have a temperature of 2940° K. Hydrogen, with a carbon addition of about 2% by weight is tangentially injected into the cavity through an injection nozzle having an expansion ratio of about 20. The direction of injection is transverse to the axis and tangential to the periphery of the cavity. The injection nozzles are situated about 95 cm. from the exit nozzle opening L and impart the propellant a velocity of $8 \times 10^5$ cm./sec. after being heated by circulation through the reactor to the wall temperature of 2940° K. The density of the gas boundary layer at the periphery is about $1.5 \times 10^{-6}$ g./cm.$^3$ and the coefficient of turbulent skin friction, $c_f$ is 0.002. The specific impulse of the fluid is 1400 seconds and the thrust is $4 \times 10^7$ dynes. These performances indicate the tremendous improvement inherent in the present method of energizing a working fluid for the purpose of rocket propulsion.

Although only the use of hydrogen as working fluid has been mentioned specifically, and only carbon and the halogens have been referred to specifically as contaminants suitable to improve the opacity of the working fluid if necessary, it is clear, that regardless of the nature of the fluid, if subjected to the expansion method proposed in this disclosure, the propulsive power obtainable is greater than in the case of converting heat energy to linear kinetic energy directly. Obviously, multiple cavities can be nested into a group, powered by the same reactor.

In view of the numerous modifications of the present reactor, I pray, that the scope of the invention be limited only by the following claims.

What is claimed is:

1. In a method for energizing a rocket propellant within a cylindrical chamber defined by the interior surfaces of an atomic fission reactor core, the steps comprising:
    (a) preheating a propellant to the temperature prevailing within said chamber by passing said propellant through said fission reactor core,
    (b) injecting said propellant into said cylindrical chamber, the direction of injection being transverse to the axis of said chamber and tangential to the periphery thereof, to form a thin annulus of propellant rotating therein in proximity to said periphery,
    (c) isothermally heating said propellant by radiation heat transfer from the interior surfaces of said fission reactor, while continuously injecting propellant into the chamber at a rate sufficient to keep the total angular momentum of the propellant therein constant, and
    (d) passing said propellant out of said cavity through a nozzle which converts the rotational kinetic energy of said propellant into axial kinetic energy.

2. Apparatus for energizing rocket propellants comprising:
    (a) high temperature atomic fission reactor core heat source, said fission reactor core defining a cylindrical chamber,
    (b) exhaust nozzle means axially aligned with that chamber, and including a closure support member peripherally secured to a first end of said fission reactor core, thereby providing a sole exit orifice from said chamber,
    (c) closure means hermetically sealing the second end of said chamber and peripherally secured to said fission reactor core,
    (d) means for injecting a gaseous rocket propellant into said chamber at the end distal to said nozzle means in a direction transverse to the axis of said chamber and tangential to the periphery thereof, and
    (e) means for preheating said propellant by heat exchange with said atomic fission reactor core, prior to injection into said chamber.

3. The method according to claim 1 wherein said propellant is injected into said chamber at a velocity corresponding to a Mach number greater than about 1.5.

4. The method according to claim 1 wherein the propellant includes an amount of higher specific opacity elements to confer upon the propellant mixture an overall opacity greater than $$\frac{c_f r_o^3 u_o^3}{c_e k T^4 \dot{r}^4} e^{M^2 \left[ \left( \frac{r_o^2}{r^2} - 1 \right) \right]} \text{ cm.}^2/\text{g.}$$

wherein $c_f$ is the coefficient of friction, $r_o$ the radius of the chamber, $u_o$ the injection velocity, M the Mach number, $r$ the radius of the nozzle, $c_e$ the velocity of light, $k$ Boltzmann's constant, and T the absolute temperature.

5. The method according to claim 4 wherein the propellant is hydrogen and the higher specific opacity additive comprises one or more elements having an atomic number between 3 and 20.

6. The method according to claim 4 wherein the higher specific opacity additive is comprised of carbon.

7. The method according to claim 1 wherein the rate of propellant injection is associated with a rate of angular momentum addition to the propellant in said chamber, said rate of angular momentum addition exceeding the rate of loss of angular momentum by the propellant due to drag in the chamber.

8. The method according to claim 7 wherein the angular momentum associated with the injected propellant is $2\rho_o u_o r_o \dot{r} L$.

Wherein $\rho_o$ is the density of the propellant, $u_o$ its injection velocity, $r_o$ the radius of the chamber, L the length of the chamber, and $\dot{r}$ the radial flow rate.

9. The method according to claim 1 wherein the mass rate of propellant injection is $$c_f u_o \frac{r_o \rho_o}{r \rho}$$

wherein $c_f$ is the coefficient of skin friction, $u_o$ the injection velocity, $r_o$ the radius of the chamber, $r$ the radius of the nozzle opening, $\rho$ the density of the propellant, and $\rho_o$ the propellant density at the wall of said chamber.

10. The method according to claim 1 wherein length and radius of the cylindrical chamber and the minimum radius of the nozzle opening are related by the formula $$L = \frac{3r^2}{8 r_o c_f} e^{M^2 \left[ \left( 1 - \frac{r_o^2}{r^2} \right) \right]}$$

wherein L is the length of the chamber, $r$ the radius of the nozzle opening, M the Mach number of the propellant, $c_f$ the coefficient of skin friction and $r_o$ the radius of the chamber.

11. The apparatus of claim 2 wherein said means for preheating said propellant and said high temperature heat source are comprised of an integral atomic reactor core structure, said structure having generally the shape of a hollow cylinder and said means for preheating said propellant comprise tubular channels traversing said core and connected to said means for injecting said rocket propellant.

12. The apparatus of claim 11 wherein said channels are positioned parallel to the axis of said chamber.

13. The apparatus of claim 2 wherein said means for injecting said rocket propellant is comprised of at least one nozzle having an expansion ratio greater than $$\exp \frac{1}{\gamma-1}$$

where gamma is the ratio of the specific heats of the propellant.

14. The apparatus of claim 2 wherein said means for injecting said propellant is comprised of an annular ring of an inner diameter substantially equal to that of said chamber, said ring being rigidly secured to said atomic reactor at the end distal said nozzle means in axial alignment with said chamber, said annular ring defining a multiplicity of injection nozzle ports directed traversely to the axis of said chamber and perpendicular to the periphery thereof, said ports having an expansion ratio of at least $$\exp \frac{1}{\gamma-1}$$

where $\gamma$ is the ratio of the specific heats of the propellant, and wherein said closure means is comprised of a centrally recessed discoidal member, said recess having a diameter substantially larger than said annular ring, and said discoidal member being rigidly secured to both said reactor structure and said annular ring in abutting relationship and axial alignment therewith.

References Cited by the Examiner

UNITED STATES PATENTS 2,690,051  9/1954  Peskin.
3,007,072  10/1961  McGinn _____ 60—35.5 X

OTHER REFERENCES

Butz, J. S.: "Advanced Nuclear Space Units Probed," Aviation Week, Nov. 16, 1959.

Krascella, N. L.: "Theoretical Investigation of Spectral Opacities of Hydrogen and Nuclear Fuel," United Aircraft Research Laboratory Report RTD-TDE-63-1101, November 1963, page 71.

Giannini, G.: "Electrical Propulsion in Space," Scientific American, March 1961, page 65.

MARK NEWMAN, *Primary Examiner.*

D. HART, *Assistant Examiner.*